United States Patent
Gao et al.

(10) Patent No.: US 10,902,289 B2
(45) Date of Patent: Jan. 26, 2021

(54) TWO-STAGE ONLINE DETECTION OF ACTION START IN UNTRIMMED VIDEOS

(71) Applicant: salesforce.com, inc., San Francisco, CA (US)

(72) Inventors: Mingfei Gao, San Jose, CA (US); Richard Socher, Menlo Park, CA (US); Caiming Xiong, Mountain View, CA (US)

(73) Assignee: salesforce.com, inc., San Francisco, CA (US)

( * ) Notice: Subject to any disclaimer, the term of this patent is extended or adjusted under 35 U.S.C. 154(b) by 59 days.

(21) Appl. No.: 16/394,992

(22) Filed: Apr. 25, 2019

(65) Prior Publication Data

US 2020/0302236 A1    Sep. 24, 2020

Related U.S. Application Data

(60) Provisional application No. 62/822,261, filed on Mar. 22, 2019.

(51) Int. Cl.
*G06K 9/62* (2006.01)
*G06K 9/00* (2006.01)

(52) U.S. Cl.
CPC ....... *G06K 9/6259* (2013.01); *G06K 9/00744* (2013.01); *G06K 9/6277* (2013.01); *G06K 2009/00738* (2013.01)

(58) Field of Classification Search
CPC ............. G06K 9/6259; G06K 9/00744; G06K 9/6277; G06K 2009/00738
See application file for complete search history.

(56) References Cited

U.S. PATENT DOCUMENTS

| | | | |
|---|---|---|---|
| 10,282,663 B2 | 5/2019 | Socher et al. |
| 10,346,721 B2 | 7/2019 | Albright et al. |
| 10,474,709 B2 | 11/2019 | Paulus |
| 2016/0350653 A1 | 12/2016 | Socher et al. |
| 2017/0024645 A1 | 1/2017 | Socher et al. |

(Continued)

OTHER PUBLICATIONS

Buch et al., "SST: Single-Stream Temporal Action Proposals," In Conference on Computer Vision and Pattern Recognition (CVPR), 2017, pp. 2911-2920.

(Continued)

*Primary Examiner* — Christopher Wait
(74) *Attorney, Agent, or Firm* — Haynes and Boone, LLP

(57) ABSTRACT

Embodiments described herein provide a two-stage online detection of action start system including a classification module and a localization module. The classification module generates a set of action scores corresponding to a first video frame from the video, based on the first video frame and video frames before the first video frames in the video. Each action score indicating a respective probability that the first video frame contains a respective action class. The localization module is coupled to the classification module for receiving the set of action scores from the classification module and generating an action-agnostic start probability that the first video frame contains an action start. A fusion component is coupled to the localization module and the localization module for generating, based on the set of action scores and the action-agnostic start probability, a set of action-specific start probabilities, each action-specific start probability corresponding to a start of an action belonging to the respective action class.

18 Claims, 14 Drawing Sheets

(56) References Cited

U.S. PATENT DOCUMENTS

| | | |
|---|---|---|
| 2017/0032280 A1 | 2/2017 | Socher |
| 2017/0140240 A1 | 5/2017 | Socher |
| 2018/0082171 A1 | 3/2018 | Merity et al. |
| 2018/0096219 A1 | 4/2018 | Socher |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0143966 A1 | 5/2018 | Lu et al. |
| 2018/0144208 A1 | 5/2018 | Lu et al. |
| 2018/0144248 A1 | 5/2018 | Lu et al. |
| 2018/0268287 A1 | 9/2018 | Johansen et al. |
| 2018/0268298 A1 | 9/2018 | Johansen et al. |
| 2018/0300317 A1 | 10/2018 | Bradbury |
| 2018/0336198 A1 | 11/2018 | Zhong et al. |
| 2018/0336453 A1 | 11/2018 | Merity et al. |
| 2018/0349359 A1 | 12/2018 | McCann et al. |
| 2018/0373682 A1 | 12/2018 | McCann et al. |
| 2018/0373987 A1 | 12/2018 | Zhang et al. |
| 2019/0130206 A1 | 5/2019 | Trott et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0130897 A1 | 5/2019 | Zhou et al. |
| 2019/0149834 A1 | 5/2019 | Zhou et al. |
| 2019/0188568 A1 | 6/2019 | Keskar et al. |
| 2019/0213482 A1 | 7/2019 | Socher et al. |
| 2019/0251168 A1 | 8/2019 | McCann et al. |
| 2019/0251431 A1 | 8/2019 | Keskar et al. |
| 2019/0258714 A1 | 8/2019 | Zhong et al. |
| 2019/0258939 A1 | 8/2019 | Min et al. |
| 2019/0286073 A1 | 9/2019 | Hosseini-Asl et al. |
| 2019/0295530 A1 | 9/2019 | Hosseini-Asl et al. |
| 2019/0362020 A1 | 11/2019 | Paulus et al. |
| 2019/0362246 A1 | 11/2019 | Lin et al. |

OTHER PUBLICATIONS

Caicedo et al., "Active Object Localization With Deep Reinforcement Learning," In International Conference on Computer Vision (ICCV), 2015, pp. 2488-2496.

Carreira et al., "Quo Vadis, Action Recognition? A New Model and the Kinetics Dataset," In Conference on Computer Vision and Pattern Recognition (CVPR), 2017, pp. 6299-6308.

Chao et al., "Rethinking the Faster R-CNN Architecture for Temporal Action Localization," In Conference on Computer Vision and Pattern Recognition (CVPR), 2018, pp. 1130-1139.

Dai et al., "Temporal Context Network for Activity Localization in Videos," In International Conference on Computer Vision (ICCV), 2017, pp. 5793-5802.

Deng et al., "ImageNet: A Large-Scale Hierarchical Image Database," In Conference on Computer Vision and Pattern Recognition (CVPR), 2009, pp. 248-255.

Gao et al., "Dynamic Zoom-in Network for Fast Object Detection in Large Images," In Conference on Computer Vision and Pattern Recognition (CVPR), 2018, pp. 6926-6935.

Gao et al., "RED: Reinforced Encoder-Decoder Networks for Action Anticipation," In British Machine Vision Conference (BMVC), 2017, 11 pages.

Gao et al., "TURN TAP: Temporal Unit Regression Network for Temporal Action Proposals," In International Conference on Computer Vision (ICCV), 2017, pp. 3628-3636.

De Geest et al., "Online Action Detection," In European Conference on Computer Vision (ECCV), 2016, pp. 269-284.

Girshick et al., "Rich Feature Hierarchies for Accurate Object Detection and Semantic Segmentation," In Conference on Computer Vision and Pattern Recognition (CVPR), 2014, pp. 580-587.

Girshick, "FAST R-CNN," In International Conference on Computer Vision (ICCV), 2015, pp. 1440-1448.

He et al., "Deep Residual Learning for Image Recognition," In Conference on Computer Vision and Pattern Recognition (CVPR), 2016, pp. 770-778.

Heilbron et al., "ActivityNet: A Large-Scale Video Benchmark for Human Activity Understanding," In Conference on Computer Vision and Pattern Recognition (CVPR), 2015, pp. 961-970.

Hoai et al., "Max-Margin Early Event Detectors," In International Journal of Computer Vision (IJCV), 2014, pp. 191-202.

Hochreiter et al., "Long Short-Term Memory," Neural Computation, 1997, pp. 1735-1780.

Ioffe et al., "Batch Normalization: Accelerating Deep Network Training by Reducing Internal Covariate Shift," In International Conference on International Conference on Machine Learning, 2015, pp. 448-456.

Jiang et al., "THUMOS Challenge: Action Recognition With a Large Number of Classes," http://crcv.uct.edu/THUMOS14/, 2014.

Karpathy et al., "Large-Scale Video Classification With Convolutional Neural Networks," In Conference on Computer Vision and Pattern Recognition (CVPR), 2014, pp. 1725-1732.

Kingma et al., "Adam: A Method for Stochastic Optimization," In International Conference on Learning Representations (ICLR), 2014,15 Pages.

Ma et al., "Learning Activity Progression in LSTMs for Activity Detection and Early Detection," In Conference on Computer Vision and Pattern Recognition (CVPR), 2016, pp. 1942-1950.

Mnih et al., "Human-Level Control Through Deep Reinforcement Learning," Nature, 2015, pp. 529-533.

Mnih et al., "Recurrent Models of Visual Attention," In Neural Information Processing Systems (NIPS), 2014, 9 Pages.

PySceneDetect, Video Scene Cut Detection and Analysis Tool, Github, Jan. 14, 2017, https://github.com/Breakthrough/PySceneDetect.

Ren et al., "Faster R-CNN: Towards Real-Time Object Detection with Region Proposal Networks," In Neural Information Processing Systems (NIPS), 2015.

Shotdetect, Automated shot detection software, https://github.com/Johmathe/Shotdeteot, May 26, 2018.

Shou et al., "CDC: Convolutional-De-Convolutional Networks for Precise Temporal Action Localization in Untrimmed Videos," In Conference on Computer Vision and Pattern Recognition (CVPR), 2017, pp. 5734-5743.

Shou et al., "Online Action Detection in Untrimmed, Streaming Videos—Modeling and Evaluation," In European Conference on Computer Vision (ECCV), 2018.

Shou et al., "Temporal Action Localization in Untrimmed Videos via Multi-Stage CNNs," In Conference on Computer Vision and Pattern Recognition (CVPR), 2016, pp. 1049-1058.

Simonyan et al., "Very Deep Convolutional Networks for Large-Scale Image Recognition," arXiv:1409.1556, 2014.

Sutton et al., "Reinforcement Learning: An Introduction," MIT press, 2018.

Tran et al., "Learning Spatiotemporal Features With 3D Convolutional Networks," In International Conference on Computer Vision (ICCV), 2015, pp. 4489-4497.

Wang et al., "Temporal Segment Networks: Towards Good Practices for Deep Action Recognition," In European Conference on Computer Vision (ECCV), 2016, pp. 20-36.

Wu et al., "Adaframe: Adaptive Frame Selection for Fast Video Recognition," arXiv:1811.12432, 2018.

Wu et al., "BlockDrop: Dynamic Inference Paths in Residual Networks," In Conference on Computer Vision and Pattern Recognition (CVPR), 2018, pp. 8817-8826.

Xu et al., "R-C3D: Region Convolutional 3D Network for Temporal Activity Detection," In International Conference on Computer Vision (ICCV), 2017, pp. 5783-5792.

Xu et al., "Temporal Recurrent Networks for Online Action Detection," arXiv:1811.07391, 2018.

Zhao et al., "Temporal Action Detection With Structured Segment Networks," In International Conference on Computer Vision (ICCV), 2017, pp. 2914-2923.

Algorithm 1 Training Process of LocNet

Initialize parameters, $W_s$, of LocNet
for iteration = 1:N do
   Obtain training sequence samples of length $T$
   for t = 1:T do
      Obtain $s_t$ based on current policy
      Sample decisions: $d_t \sim \mathcal{N}(s_t, 0.1^2)$
      Obtain $r_t$ and $\hat{V}_t$ for each sample
   end for
   Compute $R_{1:T}$, $\nabla_{W_s} J_s$ and $L_b(W_b)$
   Update parameters, $W_s$, of LocNet
end for

FIG. 8A

| | Offsets (second) | 1 | 2 | 3 | 4 | 5 | 6 | 7 | 8 | 9 | 10 |
|---|---|---|---|---|---|---|---|---|---|---|---|
| Baselines | SceneDetect | 1.0 | 2.0 | 2.3 | 3.1 | 3.6 | 4.1 | 4.7 | 5.0 | 5.1 | 5.2 |
| | ShotDetect | 1.1 | 1.9 | 2.3 | 3.0 | 3.4 | 3.9 | 4.3 | 4.5 | 4.6 | 4.9 |
| | Shou et al. | 3.1 | 4.3 | 4.7 | 5.4 | 5.8 | 6.1 | 6.5 | 7.2 | 7.6 | 8.2 |
| StartNet-PG | C3D + LocNet | 6.8 | 8.0 | 9.4 | 10.1 | 10.6 | 10.9 | 10.9 | 11.1 | 11.2 | 11.2 |
| | CNN + LocNet | 17.0 | 23.6 | 27.6 | 29.9 | 31.3 | 32.1 | 33.2 | 33.5 | 33.9 | 34.5 |
| | LSTM + LocNet | 19.5 | 27.2 | 30.8 | 33.9 | 36.5 | 37.5 | 38.3 | 38.8 | 39.5 | 39.8 |

FIG. 11A

| | Depth Rec. | @0.1 | @0.2 | @0.3 | @0.4 | @0.5 | @0.6 | @0.7 | @0.8 | @0.9 | @1.0 |
|---|---|---|---|---|---|---|---|---|---|---|---|
| Baselines | SceneDetect | 30.0 | 18.3 | 12.2 | 9.1 | 7.2 | 6.1 | 5.2 | 4.6 | 4.0 | 3.6 |
| | ShotDetect | 26.3 | 15.9 | 11.3 | 8.6 | 6.8 | 5.8 | 4.9 | 4.3 | 3.8 | 3.4 |
| | Shou et al. | 42.7 | 27.3 | 19.8 | 14.9 | 11.8 | 10.0 | 8.5 | 7.4 | 6.6 | 5.9 |
| StartNet-PG | C3D + LocNet | 34.8 | 27.7 | 22.6 | 19.0 | 16.3 | 14.4 | 12.9 | 11.8 | 10.8 | 10.0 |
| | CNN + LocNet | 71.8 | 64.7 | 58.0 | 52.4 | 47.2 | 43.3 | 39.5 | 35.9 | 32.5 | 29.6 |
| | LSTM + LocNet | 77.4 | 70.2 | 64.5 | 59.1 | 54.2 | 49.3 | 45.1 | 41.2 | 37.6 | 34.2 |

| Features | Offsets (second) | 1 | 2 | 3 | 4 | 5 | 6 | 7 | 8 | 9 | 10 |
|---|---|---|---|---|---|---|---|---|---|---|---|
| RGB | ClsNet-only | 11.8 | 17.2 | 21.3 | 24.9 | 27.9 | 28.7 | 29.5 | 30.0 | 30.4 | 30.7 |
| | StartNet-CE | 13.7 | 20.7 | 23.8 | 27.2 | 29.4 | 30.7 | 31.9 | 32.5 | 33.2 | 33.6 |
| | StartNet-PG | 15.9 | 21.0 | 24.8 | 28.4 | 30.7 | 31.8 | 33.0 | 33.5 | 34.0 | 34.4 |
| Two Stream | ClsNet-only | 13.9 | 21.6 | 25.8 | 28.9 | 31.1 | 32.5 | 33.5 | 34.3 | 34.8 | 35.2 |
| | StartNet-CE | 17.4 | 25.4 | 29.8 | 33.0 | 34.6 | 36.3 | 37.2 | 37.7 | 38.6 | 38.8 |
| | StartNet-PG | 19.5 | 27.2 | 30.8 | 33.9 | 36.5 | 37.5 | 38.3 | 38.8 | 39.5 | 39.8 |

| Features | Depth Rec. | @0.1 | @0.2 | @0.3 | @0.4 | @0.5 | @0.6 | @0.7 | @0.8 | @0.9 | @1.0 |
|---|---|---|---|---|---|---|---|---|---|---|---|
| RGB | ClsNet-only | 71.2 | 61.1 | 52.8 | 47.0 | 42.0 | 37.7 | 34.0 | 30.6 | 27.5 | 25.3 |
| | StartNet-CE | 73.2 | 64.5 | 56.8 | 50.2 | 45.1 | 40.5 | 36.6 | 33.5 | 30.5 | 27.7 |
| | StartNet-PG | 73.6 | 65.0 | 58.0 | 51.2 | 45.9 | 41.5 | 37.8 | 34.3 | 31.5 | 28.8 |
| Two Stream | ClsNet-only | 71.3 | 63.0 | 56.9 | 52.0 | 46.9 | 42.3 | 38.7 | 35.0 | 31.8 | 29.2 |
| | StartNet-CE | 72.7 | 65.6 | 60.2 | 55.3 | 51.0 | 46.8 | 43.0 | 39.2 | 36.0 | 32.9 |
| | StartNet-PG | 77.4 | 70.2 | 64.5 | 59.1 | 54.2 | 49.3 | 45.1 | 41.2 | 37.6 | 34.2 |

*FIG. 12B*

| | Offsets (second) | 1 | 2 | 3 | 4 | 5 | 6 | 7 | 8 | 9 | 10 |
|---|---|---|---|---|---|---|---|---|---|---|---|
| Baselines | SceneDetect | 2.7 | 4.1 | 5.1 | 5.9 | 6.7 | 7.5 | 8.1 | 8.7 | 9.2 | 9.8 |
| | ShotDetect | — | — | — | — | — | — | — | — | — | — |
| | Shou et al. | — | — | — | — | — | — | — | — | — | — |
| StartNet | ClsNet-only-VGG | 2.7 | 4.1 | 5.1 | 5.9 | 6.7 | 7.5 | 8.1 | 8.7 | 9.2 | 9.8 |
| | StartNet-CE-VGG | 4.2 | 6.1 | 7.4 | 8.7 | 9.7 | 10.5 | 11.4 | 12.0 | 12.6 | 13.1 |
| | StartNet-PG-VGG | 6.0 | 7.6 | 8.8 | 9.8 | 10.7 | 11.5 | 12.2 | 12.6 | 13.1 | 13.5 |
| | ClsNet-only-TS | 4.2 | 6.1 | 7.7 | 8.8 | 9.8 | 10.7 | 11.3 | 12.2 | 13.0 | 13.6 |
| | StartNet-CE-TS | 6.0 | 8.3 | 10.1 | 11.7 | 12.9 | 13.9 | 15.0 | 15.8 | 16.7 | 17.5 |
| | StartNet-PG-TS | 8.1 | 10.2 | 11.8 | 13.3 | 14.4 | 15.3 | 16.1 | 16.7 | 17.4 | 18.0 |

TWO-STAGE ONLINE DETECTION OF ACTION START IN UNTRIMMED VIDEOS

CROSS REFERENCE

The present application claims priority under 35 U.S.C. 119 to commonly-owned U.S. provisional application No. 62/822,261, filed on Mar. 22, 2019, which is hereby expressly incorporated by reference herein in its entirety.

TECHNICAL FIELD

The present disclosure relates generally to detecting an action start in a video, and more specifically to a two-stage online detection of action start (ODAS) mechanism for untrimmed videos.

BACKGROUND

Action detection applications have been widely used to identify an action in a video such as running, jumping, lifting, etc. Traditionally, action start detection is performed offline by observing the entire video, e.g., by analyzing temporal segments of the video that may contain consecutive frames. The start of the action can be recognized as the first frame that is identified to contain the particular action. Such offline analysis for action start detection usually require information from the video segments after the action start. In some time-sensitive scenarios, however, an accurate action start of a particular action is identified in real time. For example, an autonomous driving car should detect the start of the action of "pedestrian crossing" as soon as the action happens to avoid collision. For another example, a surveillance system should detect the start of an action of "trespasser entering premises" to generate an immediate alert. Traditional action detection based on the offline per-frame analysis cannot provide an action start in real time in such time-sensitive scenarios.

Accordingly, it would be advantageous to have an action start detection system that provide action start detection in real time with improved precision.

BRIEF DESCRIPTION OF THE DRAWINGS

FIG. 8A provides a simplified diagram illustrating an algorithm of the training process of the localization module as shown in FIG. 4, according to some embodiments described herein.

FIGS. 11A-13 provide example data tables illustrating performance metrics of different implementations of the classification module and the localization module, according to some embodiments.

In the figures and appendix, elements having the same designations have the same or similar functions.

DETAILED DESCRIPTION

A conventional ODAS system usually trains one artificial intelligence (AI) network that is capable of both classifying different action classes (e.g., what action class is contained in the video, "jumping," "lifting," "crawling," "rolling," etc.) and localizing the starts of different action classes (e.g., which frame in the video contains the start of an action). The conventional ODAS network usually attempts to identify a start point of a specific action class when the representation of the start point is close to that of the specific action class but significantly different from the preceding background. However, due to the subtle difference between different action classes near their respective start points and the lack of labeled training data (one action usually only contains one start point), the conventional ODAS network is often incapable of accurately identifying or differentiating the starts of different action classes.

In view of the need for an accurate real-time action start detection mechanism, embodiments described herein provide a two-stage system that employs two separate sub-systems to (1) identify an (action-agnostic) action start in a video frame and (2) detect a category or class of the action in the video frame, respectively, in an untrimmed streaming video in real time. The identified action start and the detected category of the action are then combined to generate an indication of action start of the specific action category in the video frame.

As used herein, the term "network" may include any hardware or software-based framework that includes any artificial intelligence network or system, neural network or system and/or any training or learning models implemented thereon or therewith.

As used herein, the term "module" may include hardware or software-based framework that performs one or more functions. In some embodiments, the module may be implemented using one or more neural networks.

As used herein, the term "video" may comprise a video stream that is received in real time, or a video file that is stored and accessible at a storage medium.

Figure 1:
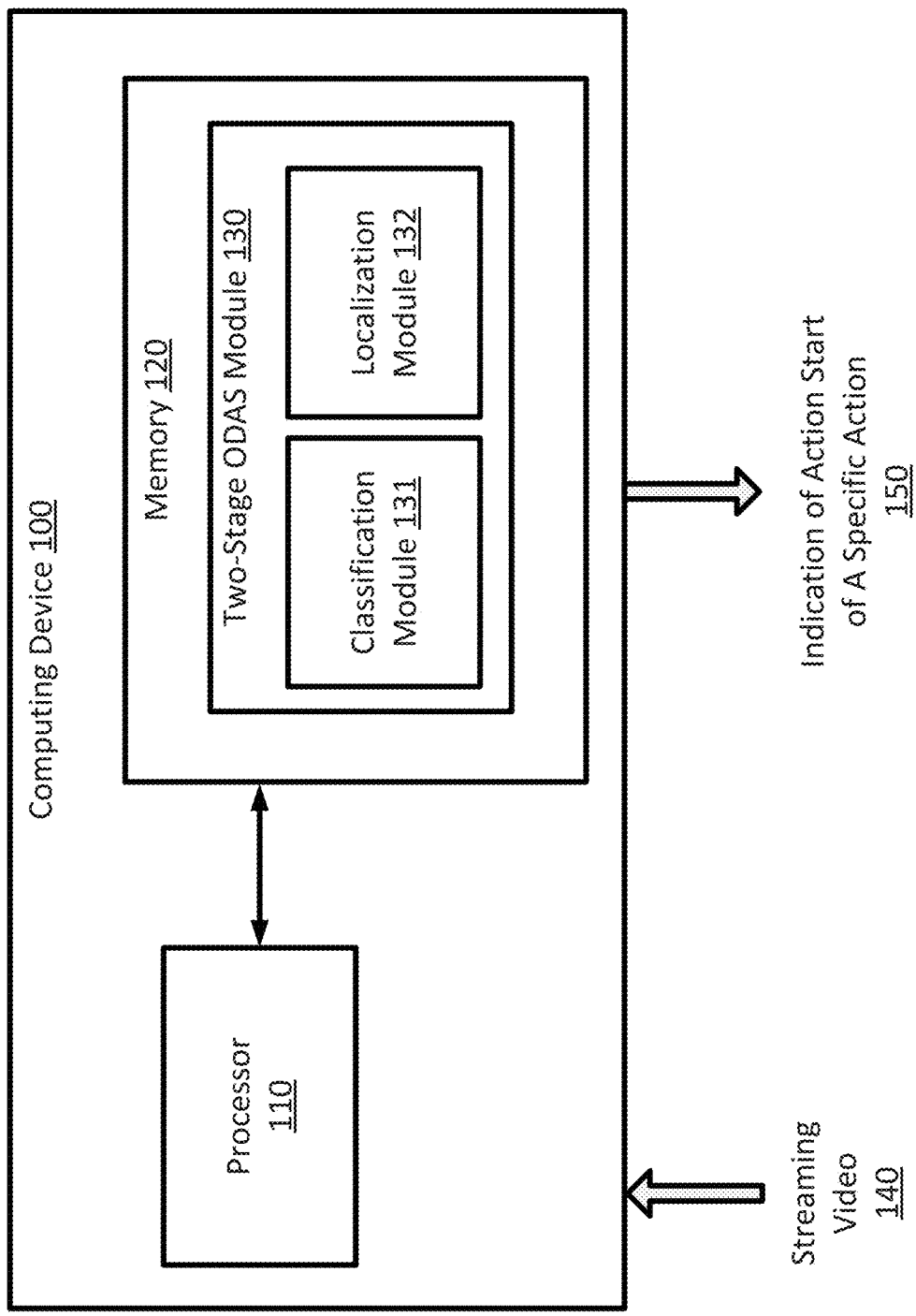
FIG. 1 is a simplified diagram of a computing device implementing a two-stage ODAS system, according to some embodiments.

FIG. 1 is a simplified diagram of a computing device 100 implementing the two-stage online action start detection process, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes a two-stage ODAS module 130 that may be used to implement and/or emulate the systems and models, and/or to implement any of the methods described further herein. In some examples, the two-stage ODAS module 130 may be used to develop, derive, or generate an action start in a streaming video as described further herein. In some examples, the two-stage ODAS module 130 may also handle the iterative training and/or evaluation of a system or model used to generate an action start.

The two-stage ODAS module 130 includes two sub-modules, the classification module 131 and the localization module 132. The classification module 131 and the localization module 132 may be operated separately, concurrently, or sequentially to receive input (e.g., a streaming video 140), compute and exchange intermediate parameters or variables, or generate a final output of an indication of the action start 150. In some examples, the two-stage ODAS module 130 and the two sub-modules 131-132 may be implemented using hardware, software, and/or a combination of hardware and software.

Figure 6:
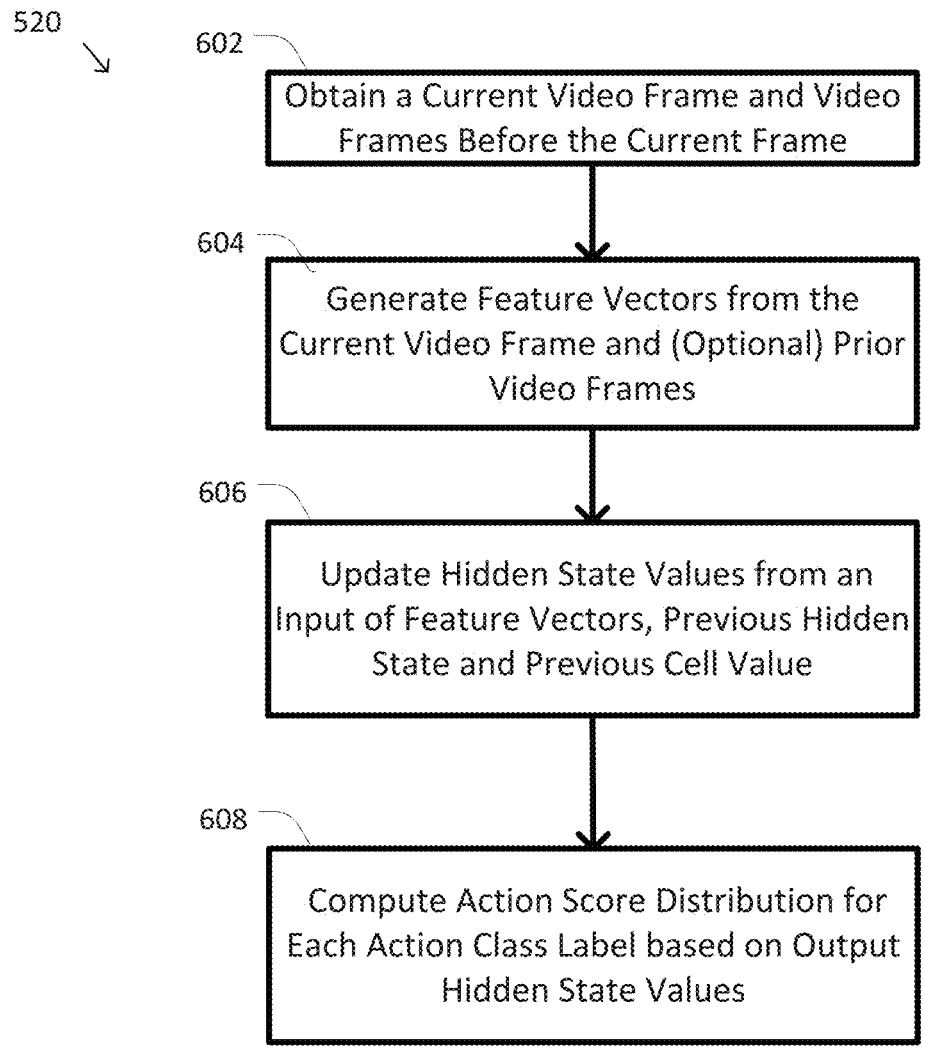
FIG. 6 is a simplified logic flow diagram showing a process of the classification module generating action score distributions, according to some embodiments.

As shown, computing device 100 receives as input a streaming video 140, which is provided to the two-stage ODAS module 130. For example, the input streaming video 140 may include a real-time video feed from a surveillance camera, a front camera of an autonomous vehicle, etc. The two-stage ODAS module 130 operates on the input video stream 140 to detect, via the classification module 131, a category of an action in the video stream, and compute, via the localization module 132, a probability of an action-agnostic start at a particular time instant. In some examples, the classification module 131 is configured to conduct per-frame labeling based on the spatial-temporal feature aggregation from input video 140, and generate action score distributions of action classes, as further discussed in relation to FIGS. 3 and 6. The localization module is configured to generate a class-agnostic start probability for a video frame of the streaming video 140 based on the historical trend of action score distributions, as further discussed in relation to FIGS. 4 and 7. The outputs from the classification module 131 and the localization module 132 are then combined to generate the final output of the action start 150 for a particular action class. For example, the final output of the action start 150 may take a form of a set of start probabilities corresponding to a set of action classes, respectively.

In some examples, the localization module 132 may be built on a recurrent neural network, which utilizes the implicit temporal constraint between action starts, e.g., two start points are unlikely to be close by. To impose the temporal constraint into the localization module 132 for processing a real-time streaming video 140, historical decisions on localization (e.g., the probability that a past frame contains an action start) are taken into account for later predictions. In some examples, the localization module 132 is trained using reinforcement learning techniques to maximize the long-term reward for start detection, as further discussed in relation to FIGS. 8A-8B.

Figure 2:
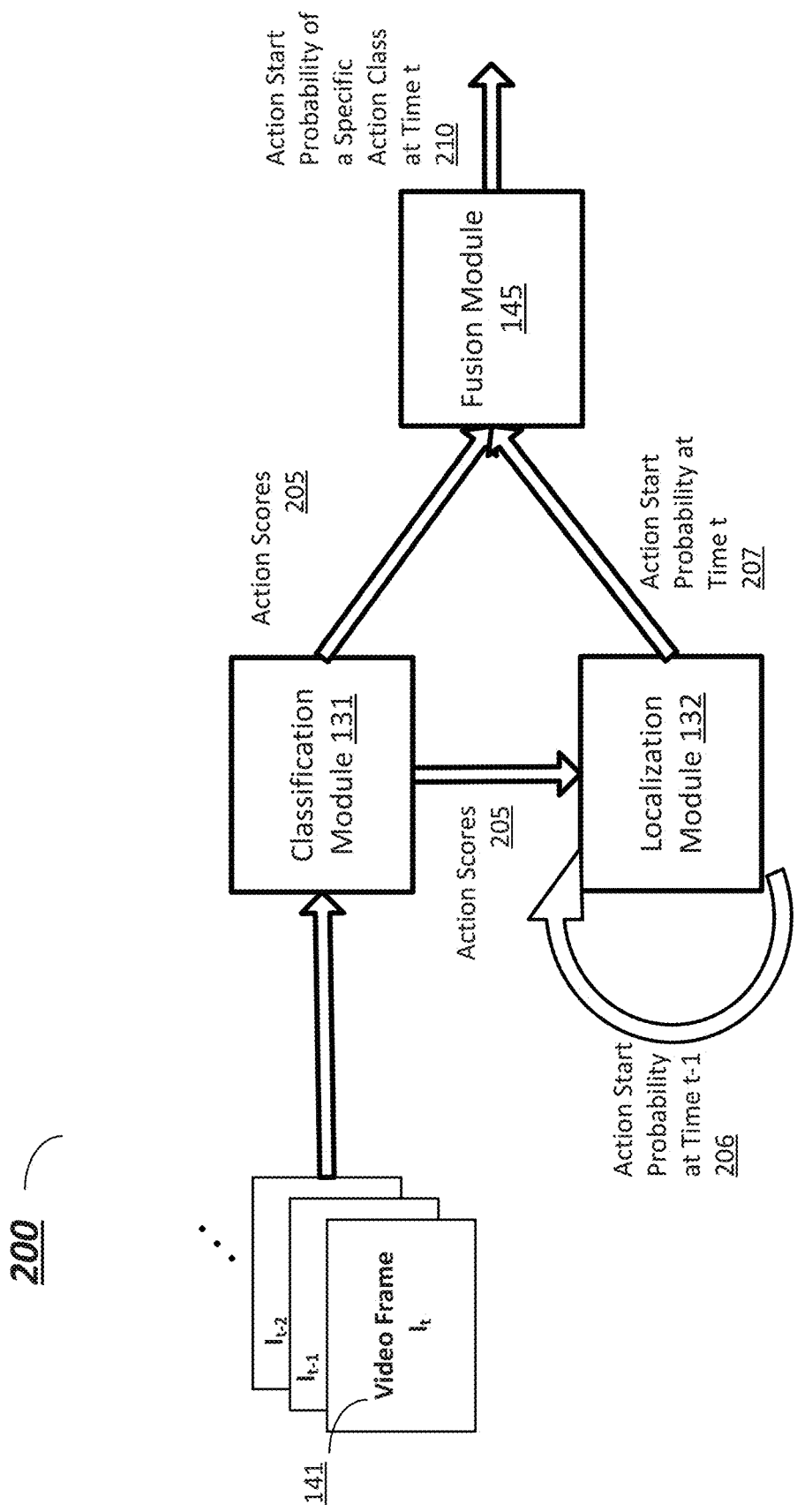
FIG. 2 is a simplified diagram illustrating a structure of the two-stage ODAS system including the classification module and the localization module, according to some embodiments.
Figure 5:
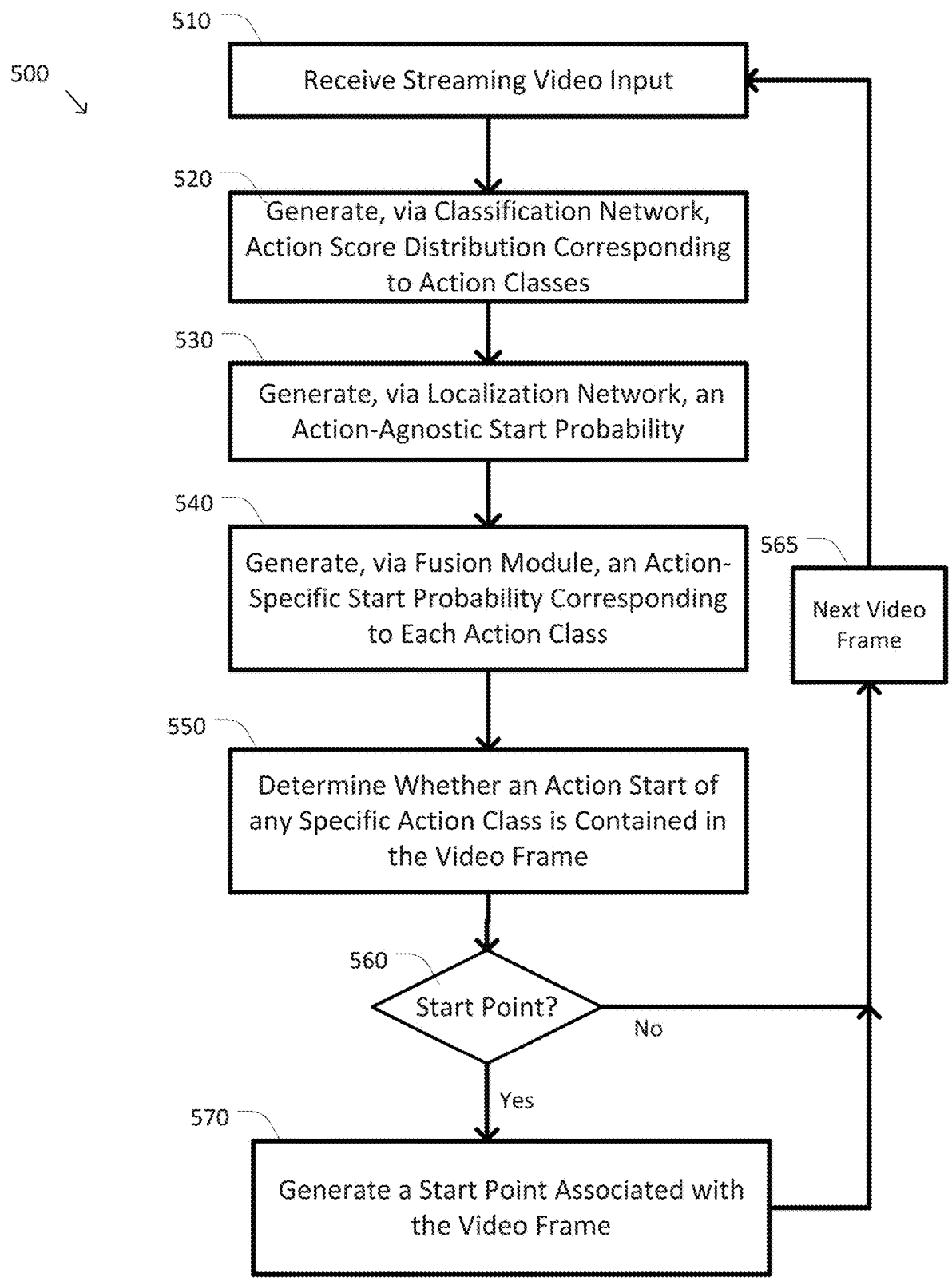
FIG. 5 is a simplified logic flow diagram showing a process of an operation of the two-stage ODAS system as shown in FIG. 2, according to some embodiments.

FIG. 2 is a simplified diagram illustrating a structure of the two-stage ODAS system 200 including the classification module 131 and the localization module 132, according to some embodiments. The classification module 131 and the localization module 132 are serially coupled such that the output of the classification module 131 is coupled to the input of the localization module 132. The input of a fusion module 145 is coupled to both outputs of the classification module 131 and the localization module 132. FIG. 2 is further described below in connection with FIG. 5, which shows a method 500 illustrating an operation of the two-stage ODAS system 200 of the classification module 131 and the localization module 132. The example method 500 including processes 510-570 in FIG. 5 may be implemented, at least in part, in the form of executable code stored on non-transitory, tangible, machine-readable media that when run by one or more processors may cause the one or more processors to perform one or more of the processes 510-570. In some embodiments, these processes may correspond to the method used by the two-stage ODAS module 130 to generate an indication of an action start for an action class.

Starting with process 510 of method 500, the two-stage ODAS system 200 receives a streaming video input (e.g., 140 in FIG. 1). In some embodiments, the streaming video 140 is decomposed into a number of consecutive video frames 141, denoted by $\{I_t, I_{t-1}, \ldots\}$. The video frames up to the current time t are fed into the classification module 131.

At process 520 of method 500, the classification module 131 performs per-frame class labeling on video frame $I_t$ at time t and generates action score distributions 205. Each action score of the action score distributions 205 corresponds to a specific action class, and each action score represents a respective probability that the video frame $I_t$ at time t contains an action of the specific action class. Further details of the classification module 131 and the process 520 are discussed in relation to FIGS. 3 and 6, respectively.

At process 530 of method 500, the localization module 132 generates an action-agnostic start probability indicating a likelihood that video frame $I_t$ may contain any action start. Specifically, the localization module 132 takes the action score distributions 205 from the classification module 131, together with the historical decisions of action start probabilities 206 in previous video frames up to the time t−1 as an input. The localization module 132 then generates an output in the form of an action-agnostic start probability 207 indicating the probability that the respective frame $I_t$ contains an action start, i.e., any action start that is agnostic of a specific action class. Further details of localization module 132 and process 530 are discussed in relation to FIGS. 4 and 7.

At process 540 of method 500, the fusion module 145 generates an action-specific start probability 210 corresponding to each action class. Specifically, the fusion module 145 is configured to receive the action score distributions 205 generated from the classification module 131, and the action-agnostic start probability 207 from the localization module 132. The fusion module 145 then outputs an action-specific probability 210, denoted as $as_t^k$, which indicates the start probability of the action class k in the video frame $I_t$ at time t, without accessing any future information of the video stream 140. For example, the action-specific probability 210 can be calculated by Equation (1):

$$as_t^k = \begin{cases} s_t p_t^{1:k-1} & k = 1:K-1 \\ (1-s_t)p_t^0 & k = 0 \end{cases} \quad \text{Eq. (1)}$$

where superscript 1: K−1 indicates positive action classes and 0 indicates background.

At process 550 of method 500, the two-stage ODAS system 200 determines whether an action start of a specific action class is contained in the video frame. For example, final action starts are generated for video frame $I_t$ if all three of the following conditions are satisfied: (i) $c_t$=argmax$_k(as_t^k)$ is an action class instead of the background, i.e., $c_t \neq 0$; (ii) $c_t \neq c_{t-1}$; and (iii) $as_t^{c_t}$ exceeds a predefined threshold. For example, the threshold may be 0. When the conditions (i)-(iii) are all satisfied at process 560, method 500 moves to process 570, where the two-stage ODAS system generates an action start point for action class $c_t$ for video frame $I_t$. Otherwise, when the conditions (i)-(iii) are not all satisfied, method 500 proceeds to process 565 for the two-stage ODAS system 200 to process the next video frame $I_{t+1}$ by repeating processes 510-560. In some examples, after generating the start point, method 500 may proceed from process 570 to process 565 to process the next video frame.

In this way, when the streaming video 140 is transmitted in real time, the two-stage ODAS system 200 processes each video frame $\{I_t, I_{t-1}, \ldots\}$ sequentially and detects the start of each action instance in real time as the streaming video 140 is transmitted.

In some examples, an action score sequence, e.g., action score distributions 205, generated by the classification module 131, may also be used to generate an action start point online following the conditions (i)-(iii) discussed above. The localization module 132 can locally adjust the start point by boosting time points corresponding to higher action-agnostic start probabilities and suppressing those with lower action-agnostic start probabilities.

Figure 3:
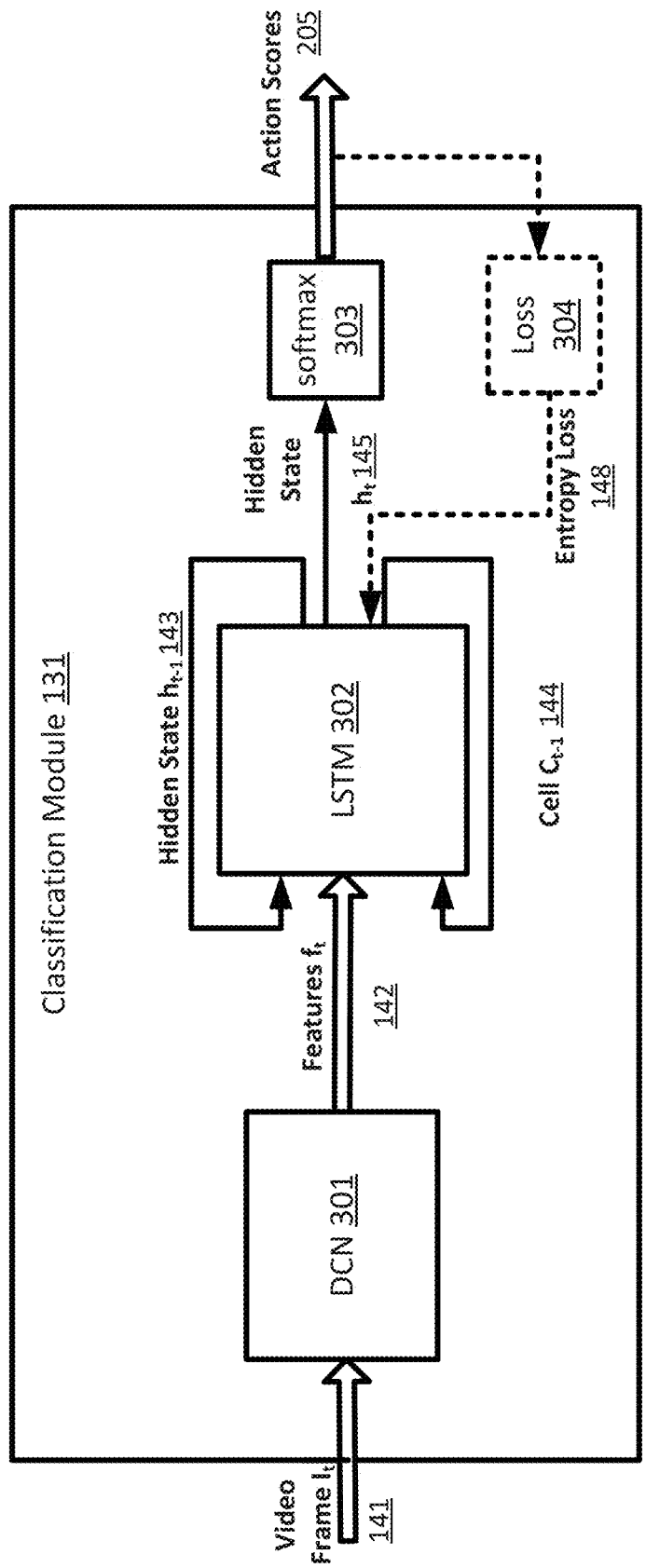
FIG. 3 is a simplified diagram illustrating a structure of the classification module, according to some embodiments.

FIG. 3 provides a simplified diagram illustrating a structure of the classification module 131, according to some embodiments. As shown in FIG. 3, the classification module 131 includes a deep convolutional network (DCN) 301, which is serially coupled to a recurrent network, e.g., a long short-term memory (LSTM) 302 that has one or more layers. The output of the LSTM 302 is fed to a softmax module 303 to generate the probability output of action score distributions 205. FIG. 3 is further described in connection with FIG. 6, which shows a process 520 of the classification module 131 generating action score distributions 205. The example process 520 including processes 602-608 in FIG. 6 may be implemented, at least in part, in the form of executable code stored on non-transitory, tangible, machine-readable media that when run by one or more processors may cause the one or more processors to perform one or more of the processes 602-608. In some embodiments, these processes may correspond to the method used by the classification module 131 to generate the action score distributions 205.

Specifically, starting at process 602, the classification module 131 obtains a current video frame $I_t$ 141 and optionally a number of video frames before the current frame $I_t$.

At process 604, at time t, the classification module 131 generates feature vectors $f_t$ 142 from the video frame $I_t$ 141 (and optionally features from past video frames before video frame $I_t$) by DCN 301. In some examples, the classification module 131 may conduct action classification based only on the arriving frame $I_t$ at time t. In this way, the classification module 131 focuses on the spatial information of the current frame $I_t$ without considering temporal patterns of actions. In some examples, the classification module 131 labels the current frame $I_t$ based on each temporal segment consisting of a set of consecutive video frames, e.g., 16 frames from $I_{t-15}$ to $I_t$.

The features extracted from the frame set $\{I_{t-15}, I_{t-14}, \ldots, I_t\}$ captures spatial and temporal information jointly using 3D convolutional operations. In some examples, the appearance (RGB) features are extracted from each video frame. In some examples, motion features are extracted from a number of consecutive frames. The extracted features $f_t$ 142 is then input to LSTM 302. In some examples, decisions are made on short temporal chunks, $C_t$, where $I_t$ is its central frame of the chunk. The appearance features (RGB) of the chunk $C_t$ is extracted from $I_t$ and the motion feature (optical flow) is computed using the whole chunk as input. In some example, the chunk size is fixed to 6 and image frames are obtained at 24 frames per second (FPS). Two adjacent chunks are not overlapping, thus, resulting in 4 chunks per second.

At process 606, at time t, the LSTM 302 updates its hidden state $h_t^{(cls)}$ 145 and cell output $c_t^{(cls)}$ based on an input of the feature $f_t$ 142, the previous hidden state $h_{t-1}^{(cls)}$ 143 and the previous cell output $c_{t-1}^{(cls)}$ 144 from time t−1. For example, the number of hidden states of LSTM 302 may be 4096. An example backbone of the classification module 131 using different sets of frames can be found in "Learning spatiotemporal features with 3d convolutional net-works" by Tran et al., Proceedings of IEEE International Conference on Computer Vision, pp. 306, 2015, which is hereby expressly incorporated by reference herein in its entirety.

At process 608, the softmax module 303 computes the action score distributions 205 for each action class based on the hidden state values $h_t^{(cls)}$ 145. For example, the action score distributions 205, in the form of a likelihood distribution over all the action classes may be computed according to Equation (2):

$$P_t = \text{softmax}(W_{CLS}^T h_t^{(cls)} + b) \quad \text{Eq. (2)}$$

wherein $p_t$ is a K-dimensional vector and K indicates the total number of action classes, e.g., 150, 200, 300, etc. action classes in total; $W_c^{(cls)}$ represents the parameter set of the classification module 131; and b represents a bias term which can be pre-defined.

As shown in FIG. 3, in some examples, classification module 131 further includes a loss module 304 for training the LSTM 302. Specifically, the loss module 304 obtains the action score distributions 205, and computes a cross-entropy loss $L_{cls}(W_c^{(cls)})$ 148 using the action score distributions 205 and action class labels for each video frame. The entropy loss 148 can then be used to backpropagate the LSTM 302 to update the parameter set $W_c^{(cls)}$ to minimize the entropy loss.

Figure 4:
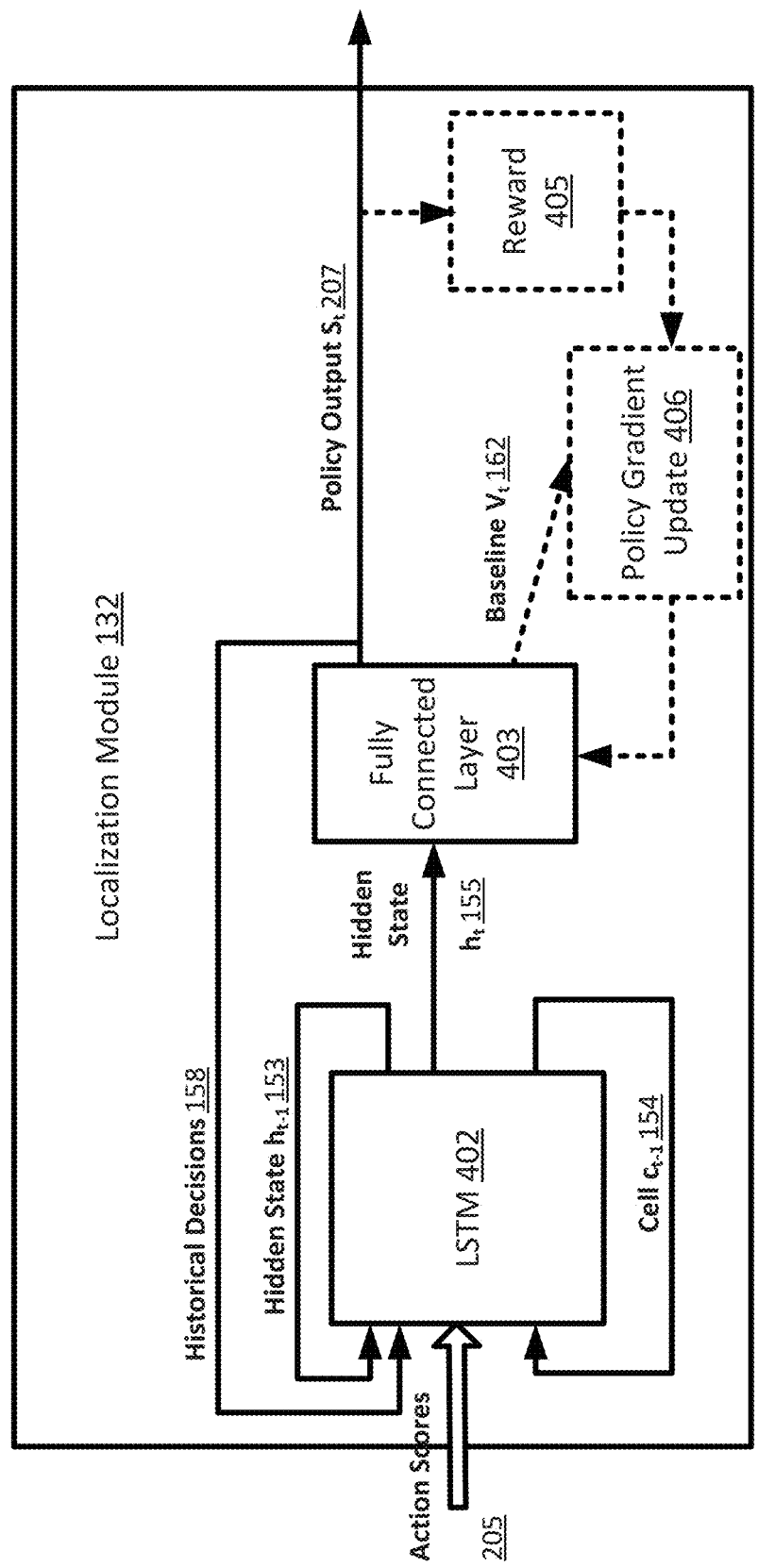
FIG. 4 is a simplified diagram illustrating a structure of the localization module, according to some embodiments.

FIG. 4 provides a simplified diagram illustrating a structure of the localization module 132, according to some embodiments. As shown in FIG. 4, the localization module 132 includes a recurrent network, such as but not limited to a one-layer LSTM 402, which is serially coupled to a fully connected layer 403. The LSTM 402 acts as an agent which interacts with historical action scores recurrently. In some examples, the LSTM 402 may contain 128 hidden states.

Specifically, at each time instance t, LSTM 402 makes a decision that predicts start probability and updates the state $h_t^{(loc)}$ of LSTM 402 according to the decision. The fully connected layer 403 is configured to output a policy output $s_t$ (which is the action-agnostic start probability 207) representing a two-dimensional start probability indicating the likelihoods that video frame $I_t$ includes a start (of any action) and does not include a start (of any action), respectively. FIG. 4 is further described below in connection with FIG. 7, which provides process 530 of the localization module 132 generating the policy output $s_t$. The example process 530 including processes 702-708 in FIG. 7 may be implemented, at least in part, in the form of executable code stored on non-transitory, tangible, machine-readable media that when run by one or more processors may cause the one or more processors to perform one or more of the processes 702-708. In some embodiments, these processes may correspond to the method used by the localization module 132 to generate an action-agnostic start probability 207.

Starting at process 702, at time t, the localization module 132 receives the action score distributions $p_t$ 205 from the classification module 131. The action score distributions $p_t$ 205 is used as part of the input to LSTM 402.

At process 704, the LSTM 402 updates the state $h_t^{(loc)}$ 155 based on an input of the previous state $h_{t-1}^{(loc)}$ 153, the previous cell $c_{t-1}^{(loc)}$ 154, the action score distributions $p_t$ 205, and previous decisions 158 of start probabilities of the prior n time instances. Specifically, the previous decisions $H_{t-1}=s_{t-n:t-1}$ indicates a vector of historical start probabilities from time instances t−n to t−1 (e.g., n=5, 8, 11, etc.). At time 0, H is initialized as a vector of zeros. At time t, LSTM 402 updates the state based on Equation (3).

$$h_t^{(loc)}, c_t^{(loc)} = \text{LSTM}(h_{t-1}^{(loc)}, c_{t-1}^{(loc)}, [p_t, H_{t-1}]) \quad \text{Eq. (3)}$$

where LSTM( ) denotes the transformation of LSTM 402; and $[p_t, H_{t-1}]$ indicates the concatenation of the vectors.

At process 706, the fully-connected layer 403 generates the policy output $s_t$ (the action-agnostic start probability 207) representing a two-dimensional start probability. For example, the policy output $s_t$ may be computed according to Equation (4).

$$s_t = \text{softmax}(W_{loc}^T h_t^{(loc)} + b) \quad \text{Eq. (4)}$$

where $W_{loc}$ denotes the set of parameters for the localization module 132; and b denotes a pre-defined bias term.

As shown in FIG. 4, to train the localization module 132, the localization module 132 further includes a reward module 405 that computes the long-term reward of start localization based on the policy output $s_t$. The localization module 132 may be trained to maximize the reward by changing the predicted start probability distribution, e.g., at a given state $h_t^{(loc)}$, the start probability should be increased when the decision of start probabilities introduces bigger reward and be decreased otherwise. For example, a baseline parameter $V_t$ 162 indicative of a variance level of the policy output $s_t$ (action-agnostic start probability 207) is concurrently generated by the fully connected layer 403 together with the policy output $s_t$. The baseline parameter $V_t$ 162 is used in a policy gradient framework (LSTM 402 and the fully connected layer 403) to reduce the variance of the gradient. The policy gradient update module 406 is then configured to generate a loss based on the current policy, the reward and the baseline parameter, which can be used to update the parameters $W_{loc}$ of the localization module 132 via backpropagation. Further details of operating the reward module 405 and the policy gradient update module 406 to train the localization module 132 are discussed in relation to FIGS. 8A-8B.

Figure 8B:
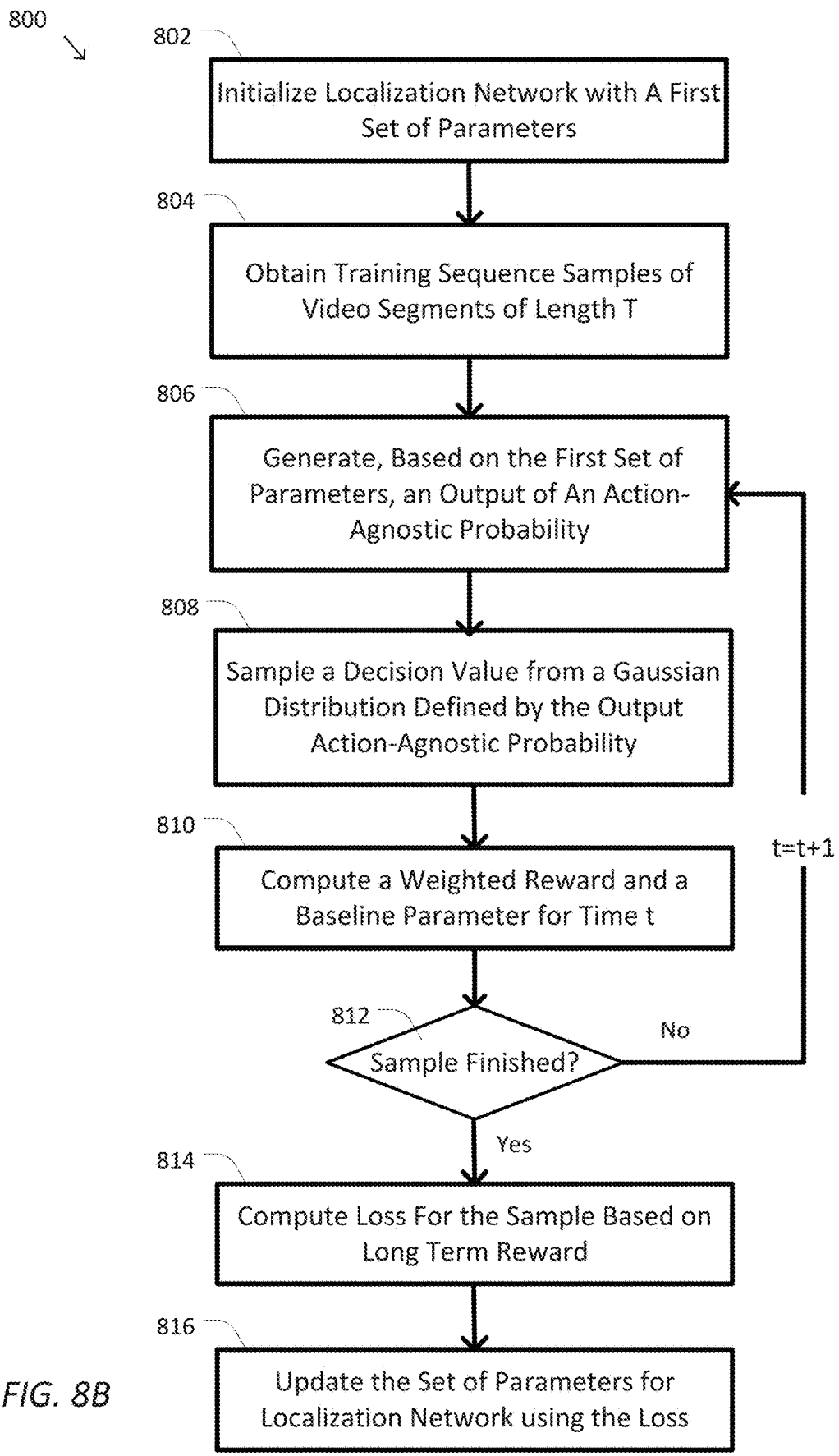
FIG. 8B is a simplified logic flow diagram showing the process of the algorithm illustrated in FIG. 8A, according to some embodiments described herein.

FIG. 8A provides a simplified diagram 801 illustrating an algorithm of the training process of the localization module 132, which is further shown in the logic flow of process 800 in FIG. 8B, according to some embodiments described herein. The example method 800 including processes 802-816 in FIG. 8 may be implemented, at least in part, in the form of executable code stored on non-transitory, tangible, machine-readable media that when run by one or more processors may cause the one or more processors to perform one or more of the processes 802-816. In some embodiments, these processes may correspond to the method used by the two-stage ODAS module 130 to train the localization module 132.

In some examples, starting at process 802, training sequence samples of video segments of a length T are obtained. Each video segment is then decomposed into a set of video frames and fed to the classification module 131 to generate the action score distributions 205 corresponding to each frame. The action score distributions 205 from the training frames is in turn fed to the localization module 132.

Figure 7:
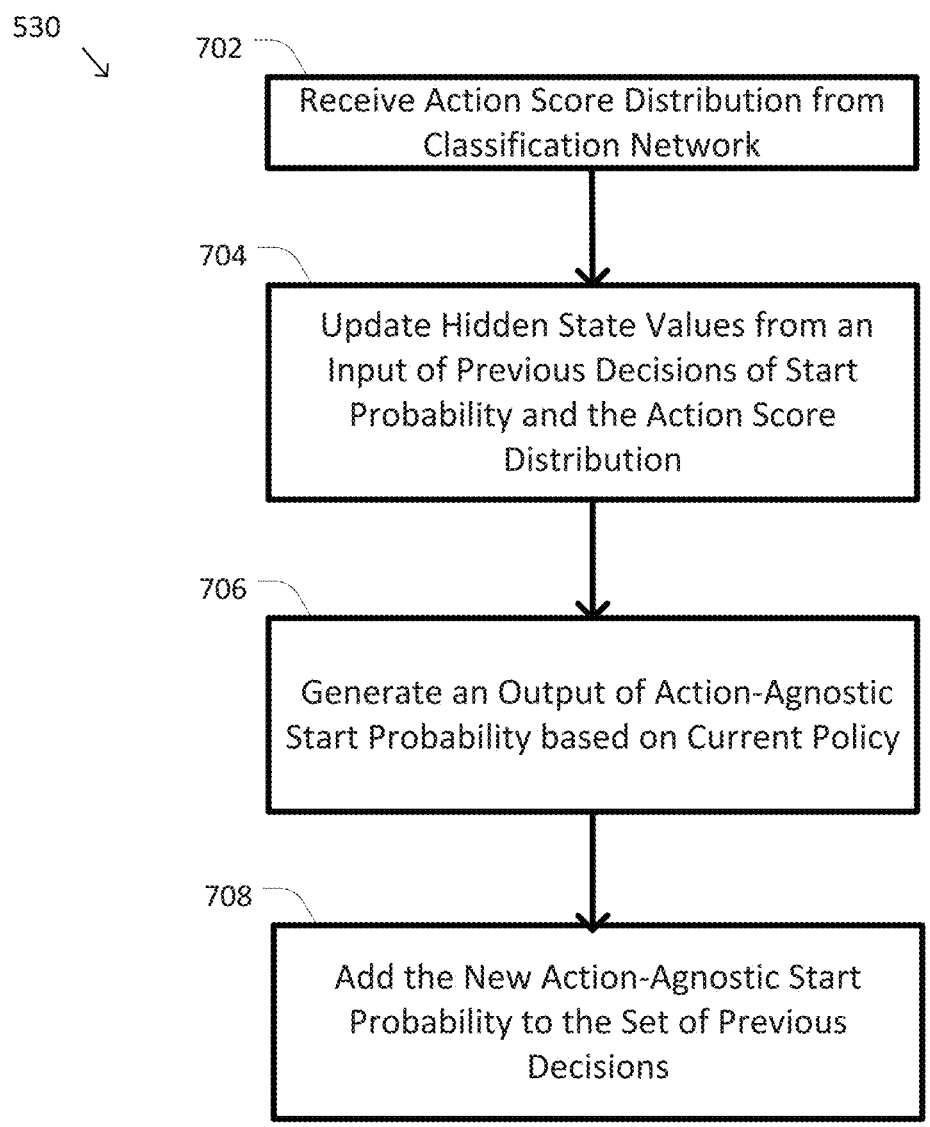
FIG. 7 is a simplified logic flow diagram showing a process of the localization module generating the policy output, according to some embodiments.

The iterative training process starts at process 806, at time instance t, a policy output $s_t$ indicating the action-agnostic probabilities is generated, via LSTM 402 and the fully-connected layer 403 configured with the current parameters $W_{loc}$ of the localization module 132, from an input of the action score distributions 205 and historical decisions 158, as described in relation to FIGS. 4 and 7.

At process 808, a decision value is sampled from a Gaussian distribution defined by the output action-agnostic start probability. For example, the decision value, denoted by $d_t$ is sampled according to a Gaussian distribution $\pi(.|h_t^{(loc)}, p_t, H_{t-1}) = N(s_t, 0.1^2)$, where $\pi(.|h_t^{(loc)}, p_t, H_{t-1})$ denotes a conditional probability distribution that is conditioned on the current values of the hidden state $h_t^{(loc)}$ 153, action score distributions $p_t$ 205, and historical decisions $H_{t-1}$ 158 up to the previous time instance t−1; and $N(s_t, 0.1^2)$ denotes a Gaussian distribution having a mean of the action-agnostic start probability 207, e.g., the policy output $s_t$ and a variance of $0.1^2$.

At process 810, a weighted reward is computed, e.g., at the reward module 405. In some examples, for each decision the policy output $s_t$ (the action-agnostic start probability 207) at a given state $h_t^{(loc)}$ is associated with an immediate reward denoted by $r_t$ to measure the decision made by the localization module 132 at the current time instance t. The immediate reward $r_t$ is computed according to Equation (5).

$$r_t = \alpha g_t d_t - (1-g_t) d_t \quad \text{Eq. (5)}$$

where $g_t \in \{0, 1\}$ indicates the ground truth label of action start of video frame $I_t$; $d_t$ is the sampled start probability; and $\alpha$ is the ratio between the number of negative samples (e.g., no action start) to positive samples (e.g., with an action start) for each dataset. The reward function to compute $r_t$ encourages a high probability when there is an actual start and a low probability when there is not by giving a negative reward. Thus, weight $\alpha$ is used to compensate for the sample imbalance between start points and background.

At process 812, when each of the video frames from the sample video segment of length T has been processed, process 800 proceeds to process 813. Otherwise, if additional video frames from the sample video segment of length T are to be processed, process 800 goes back to process 806 at the next time instance t+1 to process video frame $h_{t+1}$ through processes 806-810.

At process 814, a loss is computed based on a long-term reward for the video segment of length T. Specifically, the long-term reward is computed as indicative of the summation of discounted future rewards $r_{t+1}, r_{t+2}, \ldots$. In some examples, in order to maximize the expected long-term reward, the policy is trained by maximizing the objective $J_s(W_s)$ according to Equation (6).

$$J_s(W_s) = E_{d_t \sim (\cdot | W_s)}[\Sigma_{t=0}^\infty \gamma^t r_{t+1}]$$ Eq. (6)

where $W_s$ is the current parameters of the localization module 132, and $\gamma$ is a constant scalar for calculating the discounted re-wards over time (e.g., $\gamma$=0.9, etc.). As the objective $J_s(W_s)$ is not differentiable, updating $W_s$ via error back propagation directly using $J_s(W_s)$ can be difficult. In some examples, a policy gradient $\nabla w_s J_s$ is used to calculate the expected gradient of $J_s(W_s)$ according to Equation (7):

$$\nabla W_s J_s = \mathbb{E}\left[\Sigma_{t=0}^\infty (R_t - \hat{V}_t) \nabla W_s \log \pi(\cdot | W_s)\right]$$ Eq. (7)

where $R_t = \Sigma_{i=0}^\infty \gamma^i r_{t+1}$ indicates the long-term reward at time instance t and $\hat{V}t$ is a baseline value which is widely used in policy gradient frameworks to reduce the variance of the gradient. Further details on the use of the policy gradient can be found in "Reinforcement Learning: An Introduction" by Sutton et al., MIT press, pp. 2 and 4, 2018, which is hereby expressly incorporated by reference herein.

The baseline value $\hat{V}t$ 162 is generated at the localization module 132 at time instance t concurrently with the policy output $s_t$. For example, the policy gradient $J_s(W_s)$ is used to maximize the probability of an action with high reward given a current state $h_t^{(loc)}$ of the localization module 132. The baseline value thus encourages that the model is optimized in the direction of performance improvement. The resulting baseline value $\hat{V}t$ is used as the expected long-term reward (at the current state $h_t^{(loc)}$ to compute, e.g., at the policy gradient update module 406, the L2 loss according to Equation (8):

$$L_b(W_b) = \frac{1}{2} \| R_t - \hat{V}_t \|^2$$ Eq. (8)

The loss $L_b(W_b)$ is then used for backpropagation to update the parameters $W_{loc}$ (wherein $W_b$ denotes the variable parameters in the loss function $L_b(W_b)$) by minimizing the loss, at process 816. Further details on the backpropagation using the baseline value can be found in "Adaframe: Adaptive frame selection for fast video recognition" by Z. Wu, C. Xiong, C.-Y. Ma, R. Socher, and L. S. Davis, arXiv: 1811.12432, 2018, which is hereby expressly incorporated by reference herein in its entirety. Therefore, the full objective of training process 800 is to minimize the overall loss of the classification module 131 and the localization module 132 according to Equation (9):

$$\min L_{cls}(W_c) + \lambda_1 L_b(W_b) - \lambda_2 J_s(W_s)$$ Eq. (9)

where $\lambda_1$ and $\lambda_2$ are constant scalars (e.g., $\lambda_1 = \lambda_2 = 1$, etc.).

Figure 9A:
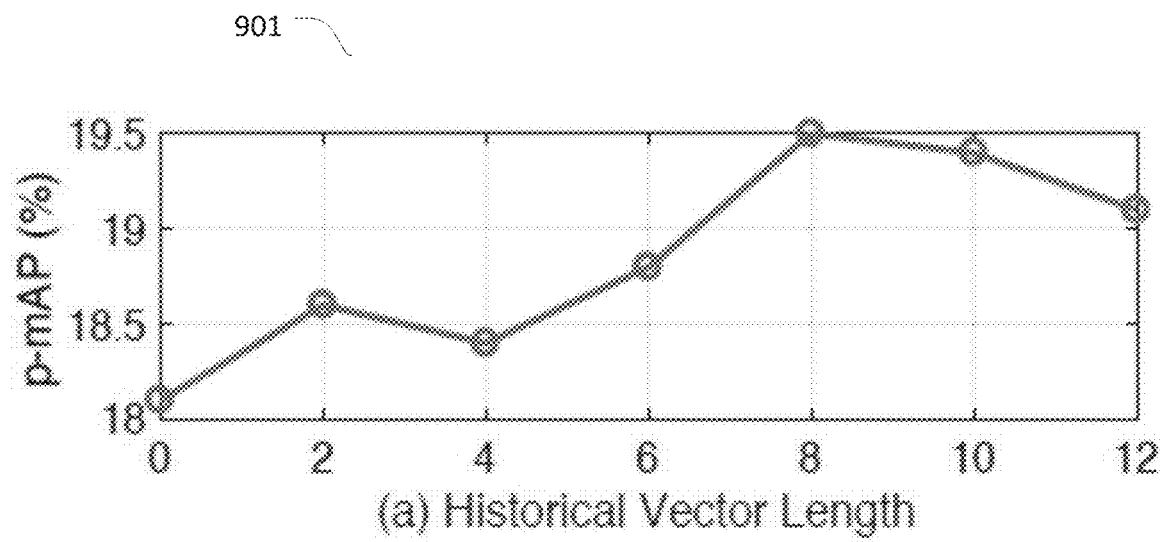
FIGS. 9A-9B provide example data plots illustrating effects of different parameters on the performance of the localization module, according to some embodiments described herein.
Figure 9B:
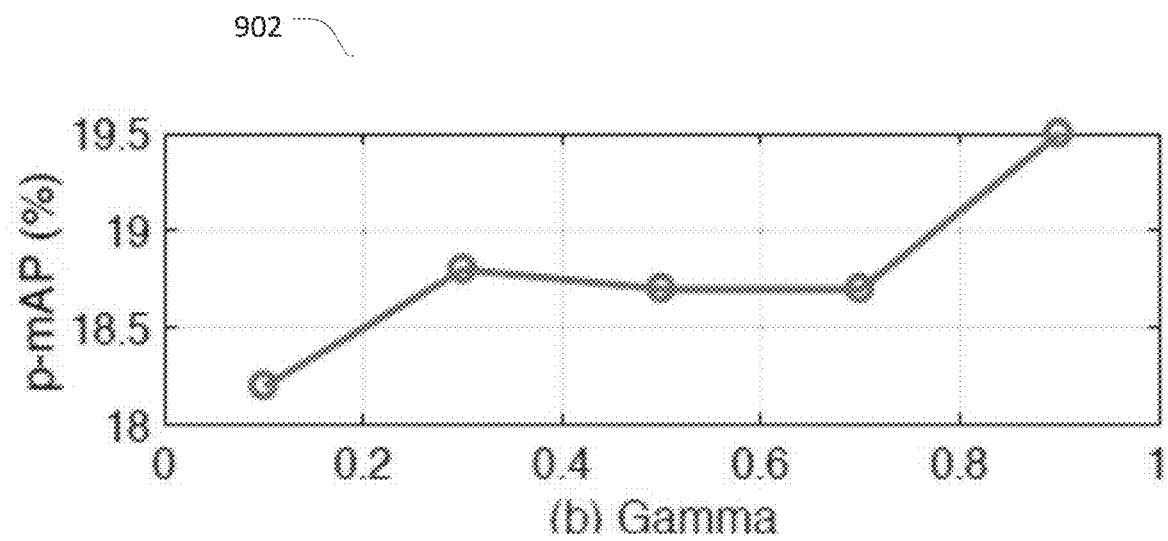

FIGS. 9A-9B provide example data plots illustrating effects of different parameters on the performance of the localization module 132, according to some embodiments described herein. Specifically, to evaluate the performance of the localization module 132, the point-level average precision (p-AP) proposed in "Online action detection in untrimmed, streaming videos-modeling and evaluation" by Shou et al., Proceedings of European Conference on Computer Vision, pp. 1, 2, 5, 6, 8, 2018, which is hereby expressly incorporated by reference herein in its entirety, is used as a performance metric. Under this protocol, each action start prediction is associated with a time point. For each action class, predictions of all frames are first sorted in descending order based on their confidence scores and then measured accordingly. An action start prediction is counted as correct only if it matches the correct action class and its temporal distance from a ground-truth point is smaller than an offset threshold (offset tolerance). Similar to segment-level average precision, no duplicate detections are allowed for the same ground-truth point. The metric p-mAP is then calculated by averaging p-AP over all the action classes.

In order to further investigate effects of parameter settings for the localization module 132 (LocNet), an ablation study on different values of gamma in Eq. (5) and the length of historical decision vector, n, when offset threshold is set to 1 second and depth rec=1.0. Increasing gamma indicates increasing the effect of future rewards to the total long-term reward. In FIG. 9A, data plot diagram 901 illustrates the effect of length of historical decision vector $H_{t-1} = s_{t-n:t-1}$, e.g., how many past decisions are used as input to the localization module 132, on the p-mAP. In FIG. 9B, data plot diagram 902 illustrates the effect of different values of $\gamma$ in Eq. (5). Generally, the localization module 132 achieves greater performance with bigger values of $\gamma$ and longer historical decision vector.

Figure 10A:
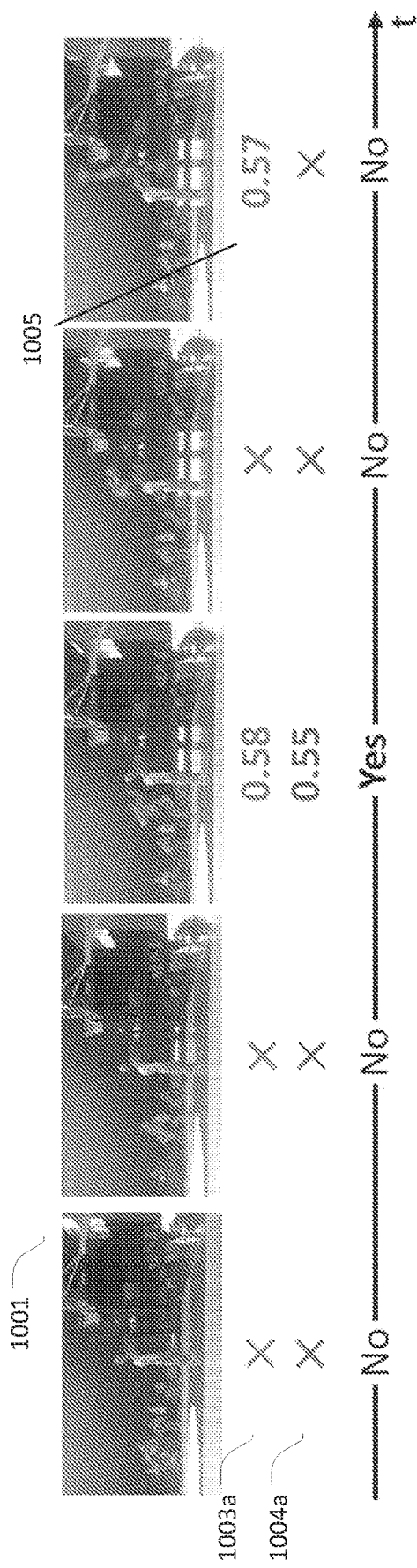
FIGS. 10A-10B provide examples comparing accuracy of the two-stage ODAS system with existing systems, according to some embodiments described herein.
Figure 10B:
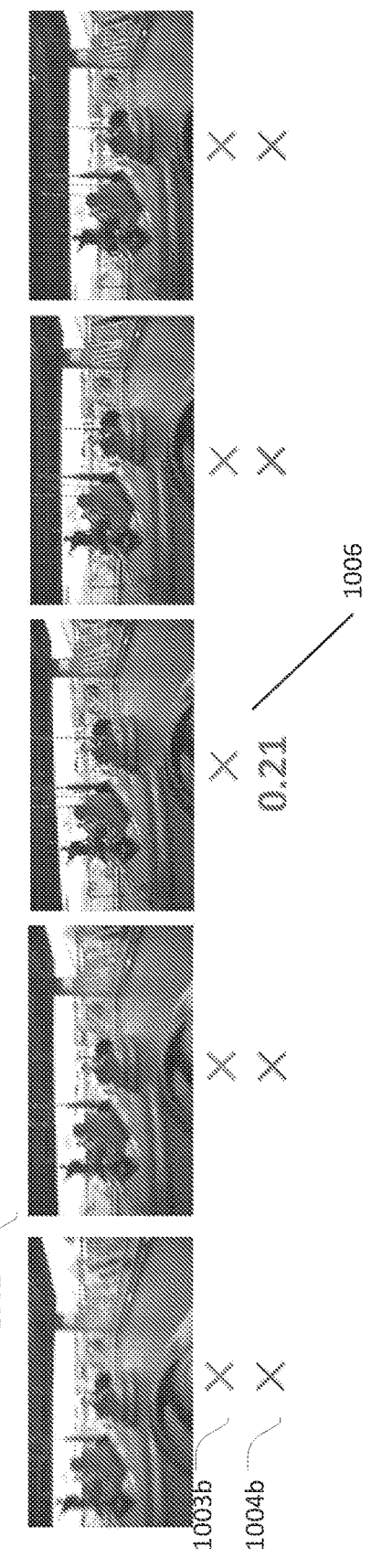

FIGS. 10A-10B provide examples comparing accuracy of the two-stage ODAS system, according to some embodiments described herein. Specifically, the series of video frames 1001 are obtained from a video showing an action of basketball dunk from the public dataset used in THUMOS Challenge 2014 of International Conference on Computer Vision, 2014. The series of video frames 1002 are obtained from a video showing an action of riding bumper cars from the public dataset ActivityNet described in "ActivityNet: A Large-Scale Video Benchmark For Hu-Man Activity Understanding" by Heilbron et al., Proceedings of the IEEE Conference on Computer Vision and Pattern Recognition, pp. 961-970, 2015. The row of "Yes/No" labels indicates the ground truth indicating whether an action of the corresponding class starts within the corresponding video frame at the time. For example, the video frame labeled as "Yes" contains an action start of basketball dunk or a bump of bumper cars. The "x" symbol indicates no action starts are detected at those times. Numbers indicate the confidence scores of detected action starts. Rows 1003a-b represent the action start detection results using a conventional classification network, and rows 1004a-b represent the action start detection results using the two-stage ODAS system described herein. As shown, when the conventional system misidentifies an action start when the video frame does not actually have an action start (see 1005), or misses an action start when the video frame contains an action start (1006), the two-stage ODAS system has generated the correct result.

FIGS. 11A-13 provide example data tables illustrating performance metrics of different implementations of the classification module 131 and the localization module 132, according to some embodiments. The p-AP metric under different offset tolerances, varying from 1 to 10 seconds is used to evaluate the performance. The metric AP depth at recall X % which averages p-AP on the Precision-Recall curve with the recall rate from 0% to X % is also used. p-mAPs under different offset thresholds are then averaged to obtain the final average p-mAP at each depth. This metric is particularly used to evaluate top ranked predictions and to measure what precision a system can achieve if low recall is allowed. In some examples, p-mAP under offset thresholds of 1-10 seconds at depth recall 1.0 is used.

In FIGS. 11A-11B, the performance p-mAP of the two-stage ODAS system is compared with existing systems proposed in Shou and the two baselines proposed in Shou, i.e., SceneDetect and Shot-Detect, using example videos from the public dataset used in THUMOS Challenge 2014. Comparison results with Shou demonstrate that the performance of the two-stage ODAS system (referred to as "StartNet-PG" in Tables 1101 and 1102) exceeds those of SceneDetect and Shot-Detect. Specifically, Table 1101 shows comparisons using p-mAP at depth rec=1.0. Results are under different offset thresholds. Specifically, the classification module (shown as "ClsNet") is implemented with different structures, i.e., C3D, CNN as discussed in Tran, and LSTM. Table 1101 shows comparisons with average p-mAP at different depths. Average p-mAP means averaging p-mAP at a depth over offset of 1-10 seconds. As shown, all previous methods are under 4% p-mAP at 1 second offset, while StartNet (the two-stage ODAS system) with LSTM achieves 19.5% p-mAP, outperforming the existing systems largely by over 15%. At 10 seconds offset, previous methods obtain less than 9% p-mAP and StartNet with LSTM improves over Shou by over 30% p-mAP. Table 1102 shows comparisons based on average p-mAP (averaging over offsets from 1 to 10 seconds) at different depths. The results demonstrate that StartNet with LSTM outperforms previous methods significantly (by around 30%-20% average p-mAP) at depth from rec=0.1 to rec=1.0.

The performance of different backbones of the classification module 131 is also compared in Tables 1101 and 1102. As shown, the two-stage ODAS system having LSTM 302 in the classification module 131 and a localization module 132 achieves the best performance among the three structures. It is worth noticing that C3D performs much worse than CNN and LSTM, which shows its disadvantage in the online action detection task. In offline setting, C3D can observe the entire temporal context of an action before making a decision, but it has to recognize the occurring action based only on the preceding temporal segment when working online.

In FIGS. 12A-12B, the performance p-mAP of the two-stage ODAS system is compared with existing systems using different features of the video frame, using example videos from the public dataset used in THUMOS Challenge 2014. Two types of features are adopted: RGB and Two-Stream (TS) features. The appearance (RGB) features are extracted at the Flatten 673 layer of each video frame, as discussed in "Deep residual learning for image recognition" by He et al., Proceedings of IEEE Conference on Computer Vision and Pattern Recognition, pp. 2 and 6, 2016, which is hereby expressly incorporated by reference herein in its entirety. Motion features are extracted at the global pool layer of BN-Inception with optical flows of 6 consecutive frames as inputs as discussed in "Long short-term memory Neural Computation" by Hochreiter et al, Neural Computation, vol. 9, iss. 8, pp. 3 and 6, 1997, which is hereby expressly incorporated by reference herein in its entirety. The TS feature is the concatenation of appearance and motion features.

As shown in Table 1201, the ClsNet-only (classification module 131) has already achieved good results, outperforming C3D based methods. When adding LocNet (localization module 132), StartNet-PG improves ClsNet-only by 5%-6% p-mAP with TS feature and by 4%-5% p-mAP with RGB features under varying offsets. A trend can be observed that the gaps between StartNet-PG and ClsNet-only are larger when the offset is smaller. As shown in Table 1202, StartNet-PG outperforms ClsNet-only by 5%-6% p-mAP with TS features and about 3%-5% p-mAP with RGB features at different depths.

In order to investigate the effect of long-term planning, the policy gradient training strategy shown in Eqs. (4)-(7) is replaced with a simple cross-entropy loss $\beta g_t \log(s_t) - (1-g_t) \log(1-s_t)$, such that every frame is considered independently. This baseline is referred as "StartNet-CE." Similar to StartNet-PG, weight factor, $\beta$, is used to handle sample imbalance. Same as a in Eq. (4), $\beta$ is set to be equal to the ratio between the number of negative samples and positive ones. As shown in Table 1201 and 1202, StartNet-PG significantly outperforms StartNet-CE under each offset threshold and at different depths, which proves the useful-ness of the long-term planning.

In Table 1300 of FIG. 13, the two-stage ODAS system is compared with p-mAP under varying offset thresholds at depth rec=1.0 using different features, using example videos from the public dataset ActivityNet. ClsNet is implemented with LSTM. The two-stage ODAS system (StartNet) significantly outperforms previous methods. Specifically, StartNet with TS feature achieves similar performance under 1 second offset tolerance compared to Shou under 10 seconds offset. At an offset of 10 seconds, the two-stage ODAS system improves Shou by around 10%. It also outperforms SceneDetect and ShotDetect largely by 13.3% and 11.9%, respectively. Even with VGG features pretrained on only images, the two-stage ODAS system significantly outperforms the existing systems. Besides, the contribution of each module is shown by comparing with ClsNet-only (classification module 131 only) and StartNet-CE. Results show that by adding LocNet, StartNet-PG improves ClsNet-only by over 3% (using VGG features) and around 4% (using TS features) p-mAP. With long-term planning, StartNet-PG significantly outperforms StartNet-CE under both features, especially when the offset tolerance is small.

The two-stage ODAS system is further compared with one-stage network. A one-stage network having similar structure as ClsNet (LSTM) except that the ClsNet directly predicts action starts for all classes is used. The two-stage ODAS system outperforms with 6.5% and 10.2% p-mAP at 1 second offset (depth rec=1.0) using RGB and TS features, respectively.

Some examples of computing devices, such as computing device 100 may include non-transitory, tangible, machine readable media that include executable code that when run by one or more processors (e.g., processor 110) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of training a start detection network for detecting an action start in a video, the method comprising:
   initializing the start detection network with a first set of parameters;
   generating a set of action scores for a first video frame from a training video sample, each action score indicating a respective probability that the first video frame contains an action from a set of action classes;
   generating from at least the set of action scores, via the start detection network initialized with the first set of parameters, a first baseline parameter and a first action-agnostic start probability that the first video frame contains an action start;
   computing a reward metric based on the first action-agnostic start probability and the first baseline parameter;
   computing a loss metric based on the reward metric and the first baseline parameter; and
   generating a second set of parameters for an updated start detection network based on the loss metric.

2. The method of claim 1, further comprising:
   at each time instance within the training video sample:
      sampling a decision value from a Gaussian distribution defined by the first action-agnostic start probability; and
      computing a weighted reward metric based on the sampled decision value and a ground truth label of action start corresponding to the video frame.

3. The method of claim 2, further comprising:
   computing the weighted reward metric for a number of time instances within the training video sample; and
   computing a long term expectation of the computed weighted reward metric over the number of time instances.

4. The method of claim 3, further comprising:
   computing a training objective from the long term expectation of the computed weighted reward metric over the number of time instances; and
   computing an expected policy gradient of the training objective based on the long term expectation and the first baseline parameter.

5. The method of claim 4, further comprising:
   using the computed expected policy gradient to obtain the second set of parameters that minimize the loss metric by backpropagation.

6. The method of claim 1, further comprising:
   configuring the updated start detection network with the second set of parameters; and
   processing a next training sample having a second video frame to iteratively update the second set parameters.

7. A system for training a start detection network for detecting an action start in a video, the system comprising:
   a classification module for generating a set of action scores for a first video frame from a training video sample, each action score indicating a respective probability that the first video frame contains an action from a set of action classes;
   a localization module initialized with a first set of parameters for
      generating from at least the set of action scores a first baseline parameter and a first action-agnostic start probability that the first video frame contains an action start;
      computing a reward metric based on the first action-agnostic start probability and the first baseline parameter;
      computing a loss metric based on the reward metric and the first baseline parameter; and
      generating a second set of parameters for an updated start detection network based on the loss metric.

8. The system of claim 7, wherein the localization module further:
   at each time instance within the training video sample:
      samples a decision value from a Gaussian distribution defined by the first action-agnostic start probability; and
      computes a weighted reward metric based on the sampled decision value and a ground truth label of action start corresponding to the video frame.

9. The system of claim 8, wherein the localization module further:
   computes the weighted reward metric for a number of time instances within the training video sample; and
   computes a long term expectation of the computed weighted reward metric over the number of time instances.

10. The system of claim 9, wherein the localization module further:
    computes a training objective from the long term expectation of the computed weighted reward metric over the number of time instances; and computes an expected policy gradient of the training objective based on the long term expectation and the first baseline parameter.

11. The system of claim 10, wherein the localization module further:

uses the computed expected policy gradient to obtain the second set of parameters that minimize the loss metric by backpropagation.

12. The system of claim 8, wherein the localization module further:

configures the updated start detection network with the second set of parameters; and processing a next training sample having a second video frame to iteratively update the second set parameters.

13. A processor-readable non-transitory storage medium storing processor-executable instructions for training a start detection network for detecting an action start in a video, the instructions executable by a processor to:

initialize the start detection network with a first set of parameters;

generate a set of action scores for a first video frame from a training video sample, each action score indicating a respective probability that the first video frame contains an action from a set of action classes;

generate from at least the set of action scores, via the start detection network initialized with the first set of parameters, a first baseline parameter and a first action-agnostic start probability that the first video frame contains an action start;

compute a reward metric based on the first action-agnostic start probability and the first baseline parameter;

compute a loss metric based on the reward metric and the first baseline parameter; and generate a second set of parameters for an updated start detection network based on the loss metric.

14. The medium of claim 13, wherein the instructions are executable by the processor further to:

at each time instance within the training video sample:

sample a decision value from a Gaussian distribution defined by the first action-agnostic start probability; and compute a weighted reward metric based on the sampled decision value and a ground truth label of action start corresponding to the video frame.

15. The medium of claim 14, wherein the instructions are executable by the processor further to:

compute the weighted reward metric for a number of time instances within the training video sample; and compute a long term expectation of the computed weighted reward metric over the number of time instances.

16. The medium of claim 15, wherein the instructions are executable by the processor further to:

compute a training objective from the long term expectation of the computed weighted reward metric over the number of time instances; and compute an expected policy gradient of the training objective based on the long term expectation and the first baseline parameter.

17. The medium of claim 16, wherein the instructions are executable by the processor further to:

use the computed expected policy gradient to obtain the second set of parameters that minimize the loss metric by backpropagation.

18. The medium of claim 13, wherein the instructions are executable by the processor further to:

configure the updated start detection network with the second set of parameters; and process a next training sample having a second video frame to iteratively update the second set parameters.

* * * * *